L. BECKHAM.
COMBINED TIRE AND FELLY.
APPLICATION FILED JAN. 22, 1912.

1,110,527.

Patented Sept. 15, 1914.

WITNESSES
L. H. Schmidt.
L. A. Stanley

INVENTOR
LINWOOD BECKHAM,
BY Munn & Co.
ATTORNEYS

UNITED STATES PATENT OFFICE.

LINWOOD BECKHAM, OF APACHE, OKLAHOMA.

COMBINED TIRE AND FELLY.

1,110,527.  Specification of Letters Patent.  Patented Sept. 15, 1914.

Application filed January 22, 1912. Serial No. 672,714.

*To all whom it may concern:*

Be it known that I, LINWOOD BECKHAM, a citizen of the United States, and a resident of Apache, in the county of Caddo and State of Oklahoma, have made certain new and useful Improvements in Combined Tires and Fellies, of which the following is a specification.

My invention relates to improvements in combined tires and fellies, and it consists in the combinations, constructions, and arrangements herein described and claimed.

An object of my invention is to obviate the necessity of providing both the felly and the tire, while at the same time making a wheel which serves the same purpose as a wheel of the ordinary type.

A further object of my invention is to provide a wheel in which the combined tire and felly may be adjusted so as to firmly hold the spokes of the wheel.

A further object of my invention is to provide a novel form of joint at the ends of the sections.

Other objects and advantages will appear in the following specification and the novel features of the device will be particularly pointed out in the appended claims.

My invention is illustrated in the accompanying drawings in which—

Figure 1:
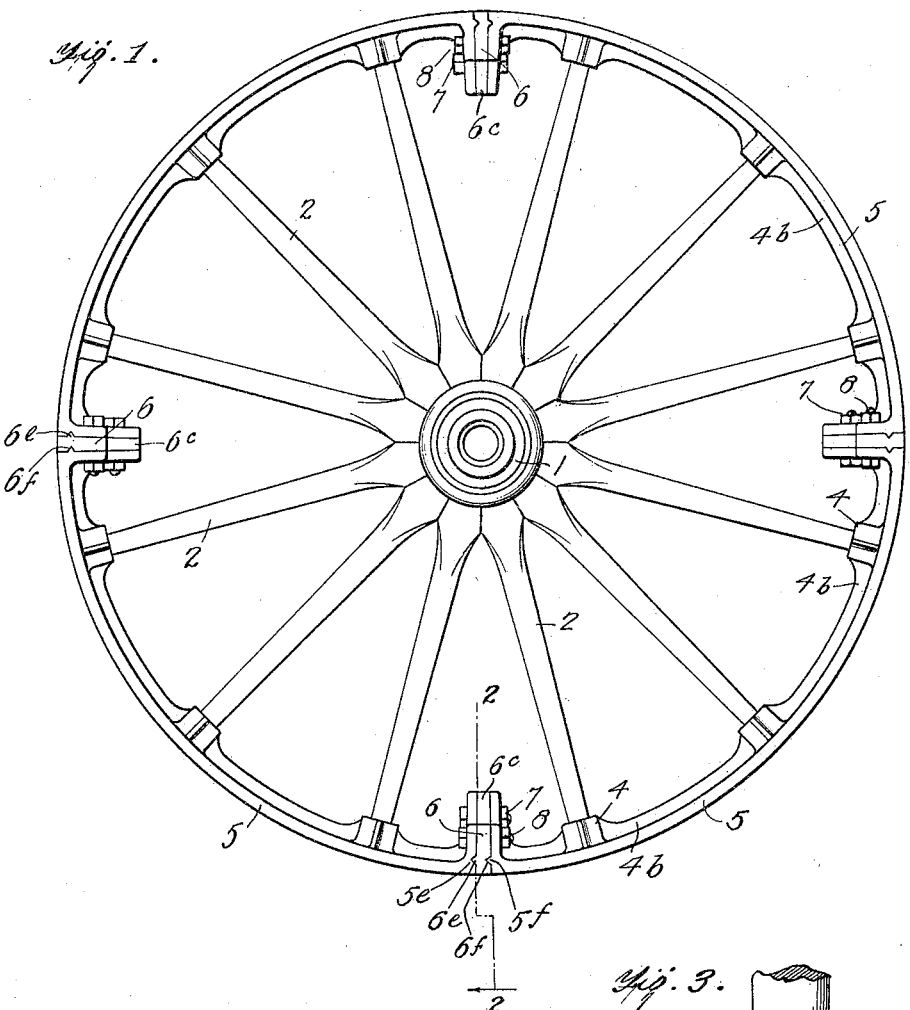
Figure 2:
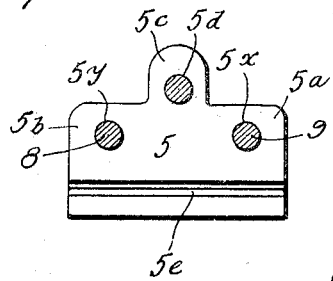
Figure 4:
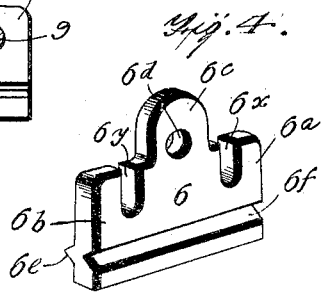
Figure 3:
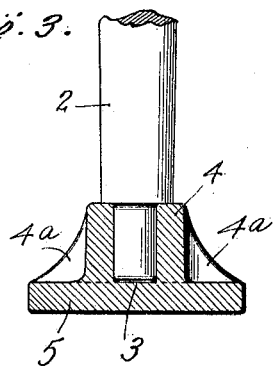

Figure 1 is a side view of a wheel constructed according to my invention, Fig. 2 is a section along the line 2—2 of Fig. 1, Fig. 3 is an enlarged section through one of the spoke sockets, and Fig. 4 is a perspective view of one of the spacing plugs.

In carrying out my invention I provide a central hub 1 having spokes 2 radiating therefrom in the ordinary manner. The ends of these spokes enter sockets 3 in lugs 4 such as that shown in Fig. 3. The lugs 4 are preferably cast integrally with the tire sections such as those shown at 5 in Fig. 1. The lugs have transverse brace members or flanges $4^a$, and flanges $4^b$ at right angles to the flanges $4^a$ for strengthening the tire section and the lugs at these points. The flanges $4^b$ may be extended along the inner surface of the tire 5 from one lug to the adjacent lug as shown in Fig. 1, thereby forming a strengthening rib. In the lighter forms of the wheels I may dispense with the strengthening ribs.

The means for joining the sections is clearly shown in Fig. 1. In this figure it will be seen that the ends of the tire sections have lateral extensions such as those shown at $5^a$ and $5^b$ in Fig. 2, and an inwardly extending portion $5^c$. The portions $5^a$ and $5^b$ are provided with the respective holes $5^x$ and $5^y$ while the extension $5^c$ is provided with a bolt hole $5^d$. One end of the tire section is provided with a notch $5^e$ while the end of the adjacent tire section is provided with a tongue $5^f$ of the same shape and size as the notch $5^e$.

The spacing plate or plug is shown in Fig. 4. It consists of a wedge-shaped body portion 6 having lateral extensions $6^a$ and $6^b$ and a central extension $6^c$. The slots $6^x$ and $6^y$ are arranged to register with the holes $5^x$ and $5^y$ respectively and the opening $6^d$ is arranged to register with the opening $5^d$. The plug is provided with a tongue $6^a$ on one side and a notch $6^f$ on the other.

From the foregoing description of the various parts of the device the operation thereof may be readily understood.

In assembling the parts the spokes are placed in their respective sockets 3. The spacing plug is placed between adjacent ends of the tire sections so that the slots and openings for the bolts are in alinement, the tongue $6^e$ entering the notch $5^e$ and the tongue $5^f$ entering the notch $6^f$. A bolt 7 is now passed through the openings $5^d$ and $6^d$ and the sections are drawn into their approximately permanent position. Tightening bolts 8 and 9 are now placed in the slots $5^y$ and $5^x$ respectively and the sections are drawn tightly into position thereby holding the spokes firmly in place. The engagement between the tongues $5^f$ and $6^e$ and the notches $5^e$ and $6^f$ held the members in position prior to positioning the bolts 7 and 8. This notch and tongue combination also prevents the shearing of the bolts in the event of the tire being struck a sharp blow adjacent the joints thereof. This could very easily be caused by a heavily loaded wagon passing over rough roads.

The wheel thus constructed presents a neat appearance and is strong and durable. The sections may be adjusted by tightening or loosening the bolts 8 or 9 as occasion demands.

I claim:

In a combined tire and felly, the combination with a plurality of tire sections, said sections being offset at their meeting ends, one of the offset ends having a rib formed thereon and the other of the offset ends having a groove formed therein, said offset ends having inner and outer alining openings formed therein, bolts extending through said openings, a spacing block slidable between said offset ends, said spacing block having slots formed therein in alinement with the outer openings in the offset ends of the tire sections, for the purpose of receiving the outer bolts, said spacing block having an opening therein in alinement with the inner openings for receiving the inner bolt, a rib formed upon the spacing block for engagement with the groove in one offset end, and a groove formed upon the spacing block for receving the rib on the opposite offset end.

LINWOOD BECKHAM.

Witnesses:
A. N. BENEDICT,
L. C. FREEMAN.